United States Patent
Yang

(10) Patent No.: US 10,045,397 B2
(45) Date of Patent: Aug. 7, 2018

(54) DATA COMPLEMENTING METHOD AND APPARATUS

(71) Applicant: BEIJING QIHOO TECHNOLOGY COMPANY LIMITED, Beijing (CN)

(72) Inventor: Ting Yang, Beijing (CN)

(73) Assignee: BEIJING QIHOO TECHNOLOGY COMPANY LIMITED, Beijing (CN)

( * ) Notice: Subject to any disclaimer, the term of this patent is extended or adjusted under 35 U.S.C. 154(b) by 0 days.

(21) Appl. No.: 15/539,966

(22) PCT Filed: Nov. 9, 2015

(86) PCT No.: PCT/CN2015/094153
§ 371 (c)(1),
(2) Date: Jun. 26, 2017

(87) PCT Pub. No.: WO2016/101718
PCT Pub. Date: Jun. 30, 2016

(65) Prior Publication Data
US 2017/0359853 A1  Dec. 14, 2017

(30) Foreign Application Priority Data
Dec. 24, 2014 (CN) .......................... 2014 1 0818146

(51) Int. Cl.
*G06F 15/16* (2006.01)
*H04W 84/20* (2009.01)
*G06F 17/30* (2006.01)

(52) U.S. Cl.
CPC ...... *H04W 84/20* (2013.01); *G06F 17/30581* (2013.01)

(58) Field of Classification Search
CPC .............................. H04W 84/20; G06F 17/30
(Continued)

(56) References Cited

U.S. PATENT DOCUMENTS

2006/0200533 A1* 9/2006 Holenstein ........ G06F 17/30578
709/208
2012/0166390 A1* 6/2012 Merriman ......... G06F 17/30578
707/613

FOREIGN PATENT DOCUMENTS

CN 102761528 A 10/2012
CN 103020243 A 4/2013
(Continued)

OTHER PUBLICATIONS

International Search Report and Written Opinion for Application No. PCT/CN2015/094153 dated Feb, 16, 2016.

*Primary Examiner* — Glenford Madamba
(74) *Attorney, Agent, or Firm* — Alston & Bird LLP

(57) ABSTRACT

Embodiments of the invention provide a data complementing method and apparatus, which relate to the field of computer. In the method provided by the invention, in the process of master database switching in a master-slave database cluster, a slave database is selected from the database cluster to act as a new master database; first connections between the new master database and all the other slave databases are established successively; the data of the new master database is compared with the data of all the other slave databases, respectively, to synchronize new data in all the other slave databases into the new master database, to accomplish data complementing of the new master database, which causes the new master database to have the latest data in the database cluster, guarantees smooth switching of the master database, and therefore will not influence normal running of database services.

13 Claims, 7 Drawing Sheets

(58) Field of Classification Search
USPC .......................................................... 709/209
See application file for complete search history.

(56) References Cited

FOREIGN PATENT DOCUMENTS

| | | |
|---|---|---|
| CN | 104537046 A | 4/2015 |
| JP | 2010277348 A | 12/2010 |

\* cited by examiner

| Return | Query result |
|---|---|
| Express | V00020305836 |
| 12-07 01:59 | Beijing Haidian Express Company  Packaged |

Figure 4

← Feel oneself is cute！ (17)

A — I want to go out for fun on Sunday, and ask for accompanying!

B — Where to go?

A — Houhai?

B — No, it is cold O(∩_∩)O

A — How about the 360 corporate headquarters?

B — Where is the 360 corporate headquarters ?

Enter information

Figure 5

DATA COMPLEMENTING METHOD AND APPARATUS

FIELD OF THE INVENTION

The invention relates to the field of computer, and in particular, to a data complementing method and apparatus.

BACKGROUND OF THE INVENTION

At present, the application of relational databases is very broad, for example, a MYSQL database. Nowadays, relational database clusters mostly adopt a one-master-multiple-slave architecture. As shown in FIG. 1, FIG. 1 is a schematic diagram of the architecture of a MYSQL database cluster, which comprises a master database and three slave databases, the three slave databases being:

Slave-1, Slave-2 and Slave-3, respectively.

For example, as shown in FIG. 1, Slave-1 and Slave-2 are located in a computer room 1, and Slave-3 is located in a computer room 2. The master database is connected with the slave databases Slave-1, Slave-2 and Slave-3, respectively.

In actual use of a database, the master database master might run down due to various reasons. At this point, to reduce the influence of the database to the services, it is necessary to select a slave database to act as a new master database to replace the original master database. In the database cluster, it is required that the master database must save the latest data in the current database cluster, and therefore it is necessary to complement the data in the new master database. However, currently, there is no effective technical means capable of conducting data complementing for a new master database at the time of switching a master database of a database cluster.

SUMMARY OF THE INVENTION

In view of the above problem, the invention is proposed to provide a data complementing method and a corresponding apparatus, which overcome the above problem or at least in part solve or mitigate the above problem.

According to an aspect of the invention, there is provided a data complementing method applied in master database switching in a master-slave database cluster, the method comprising:

selecting a slave database from the database cluster to act as a new master database;

establishing first connections between the new master database and all the other slave databases successively;

comparing data of the new master database with data of all the other slave databases, respectively, to synchronize new data in all the other slave databases into the new master database; and finishing data complementing of the new master database when data comparison and synchronization of all the other slave databases is accomplished.

According to another aspect of the invention, there is provided a data complementing method applied in master database switching in a master-slave database cluster, the method comprising:

a) selecting a slave database from the database cluster to act as a new master database;

b) establishing a first connection between the new master database and one other slave database;

c) comparing t data of the new master database with data of the other slave database, to synchronize new data in the other slave database into the new master database;

d) repeating steps b) and c), until data comparison and synchronization is accomplished for the new master database and all the other slave databases; and e) establishing second connections between the new master database and all the other slave databases, to synchronize data of the new master database to all the other slave databases.

According to another aspect of the invention, there is provided a data complementing apparatus applied in master database switching in a master-slave database cluster, the apparatus comprising:

a first master database selecting module configured to select a slave database from the database cluster to act as a new master database;

a first connection establishing module configured to establish first connections between the new master database and all the other slave databases successively;

a first synchronizing module configured to compare data of the new master database with data of all the other slave databases, respectively, to synchronize new data in all the other slave databases into the new master database; and a first complementing confirmation module configured to finish data complementing of the new master database when the data contrast and synchronization of all the other slave databases is accomplished.

According to another aspect of the invention, there is provided a data complementing apparatus applied in master database switching in a master-slave database cluster, the apparatus comprising:

a second master database selecting module configured to select a slave database from the database cluster to act as a new master database;

a third connection establishing module configured to establish a first connection between the new master database and one other slave database;

a third synchronizing module configured to compare data of the new master database with data of the other slave database, to synchronize new data in the other slave database into the new master database;

a second complementing confirmation module configured to repeat the operations performed by the third connection establishing module and the third synchronizing module, until data comparison and synchronization is accomplished between the new master database and all the other slave databases; and a fourth connection establishing module configured to establish second connections between the new master database and all the other slave databases, to synchronize data of the new master database to all the other slave databases.

According to still another aspect of the invention, there is further provided a computer program comprising a computer readable code which causes a computing device to perform any of the data complementing methods described above, when said computer readable code is running on the computing device.

According to yet still another aspect of the invention, there is further provided a computer readable medium storing the above described computer program therein.

The beneficial effects of the invention lie in that:

Embodiments of the invention provide a data complementing method and apparatus. In the process of master database switching in a master-slave database cluster, a slave database is selected from the database cluster to act as a new master database; first connections between the new master database and all the other slave databases are established successively; the data of the new master database is compared with the data of all the other slave databases, respectively, to synchronize new data in all the other slave databases into the new master database, to accomplish data complementing of the new master database, which causes the new master database to have the latest data in the database cluster, guarantees smooth switching of the master database, and therefore will not influence normal running of database services.

The above description is merely an overview of the technical solutions of the invention. In the following particular embodiments of the invention will be illustrated in order that the technical means of the invention can be more clearly understood and thus may be embodied according to the content of the specification, and that the foregoing and other objects, features and advantages of the invention can be more apparent.

BRIEF DESCRIPTION OF THE DRAWINGS

Various other advantages and benefits will become apparent to those of ordinary skills in the art by reading the following detailed description of the preferred embodiments. The drawings are only for the purpose of showing the preferred embodiments, and are not considered to be limiting to the invention. And throughout the drawings, like reference signs are used to denote like components. In the drawings:

FIG. 4 shows schematically a schematic diagram of the flow of a method for selecting a new master database in a MYSQL database cluster provided by an embodiment of the invention;

FIG. 5 shows schematically a schematic diagram of the architecture of a MYSQL database cluster after selecting a new master database provided by an embodiment of the invention;

DETAILED DESCRIPTION OF THE INVENTION

In the following the invention will be further described in conjunction with the drawings and the particular embodiments.

Embodiment One

An embodiment of the invention provides a data complementing method, which may implement data complementing of a new master database in the process of master database switching in a database cluster, and guarantee the normal running of the database cluster.

The data complementing method provided by embodiment One is a way of first establishing connections of the new master database and all the other slave databases, and then conducting data contrast and synchronization of it with the slave databases.

Figure 2:
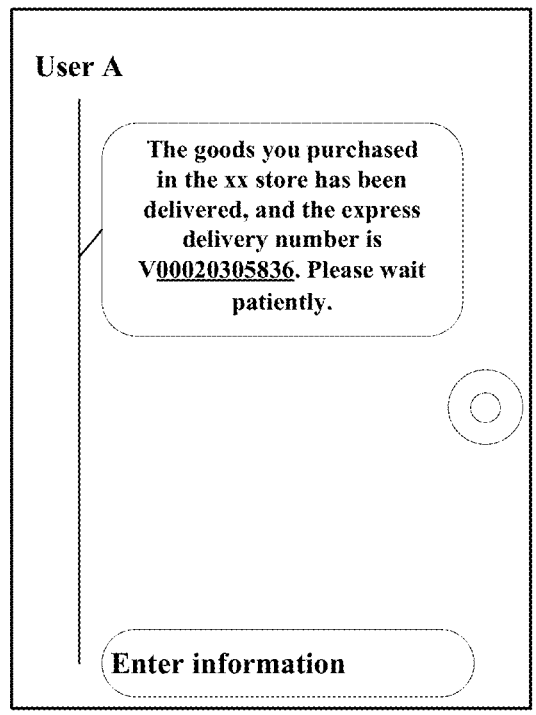
FIG. 2 shows schematically a schematic diagram of the flow of a data complementing method according to an embodiment of the invention.

FIG. 2 is a schematic diagram of the flow of a data complementing method provided by the embodiment, which method is applied in master database switching in a master-slave database cluster and specifically comprises step S202 to step S208.

At S202, a slave database is selected from the database cluster to act as a new master database.

At S204, first connections between the new master database and all the other slave databases are established successively.

At S206, the data of the new master database is compared with the data of all the other slave databases, respectively, to synchronize new data in all the other slave databases into the new master database.

At S208, data complementing of the new master database is finished when the data comparison and synchronization of all the other slave databases is accomplished.

The embodiment of the invention provides a data complementing method, in which in the process of master database switching in a master-slave database cluster, a slave database is selected from the database cluster to act as a new master database; first connections between the new master database and all the other slave databases are established successively; the data of the new master database is compared with the data of all the other slave databases, respectively, to synchronize new data in all the other slave databases into the new master database, to accomplish data complementing of the new master database, which causes the new master database to have the latest data in the database cluster, guarantees smooth switching of the master database, and therefore will not influence normal running of database services.

Embodiment Two

This embodiment is a specific application scenario of the above embodiment One, and by this embodiment, the method provided by the invention can be elucidated more clearly and particularly.

It should be appreciated that the invention does not define the type of a database, and any database may be applied herein, as long as it may use the following scheme of the invention to achieve the goal of high availability. In addition, the connection control apparatus is also not defined to be implemented by a server, and on the basis of reading the invention, the skilled in the art may also embody the connection control apparatus in other ways, which should all be encompassed within the scope of the invention.

In the following, a technical solution of the invention will be illustrated taking a MYSQL database as an example.

Figure 1:
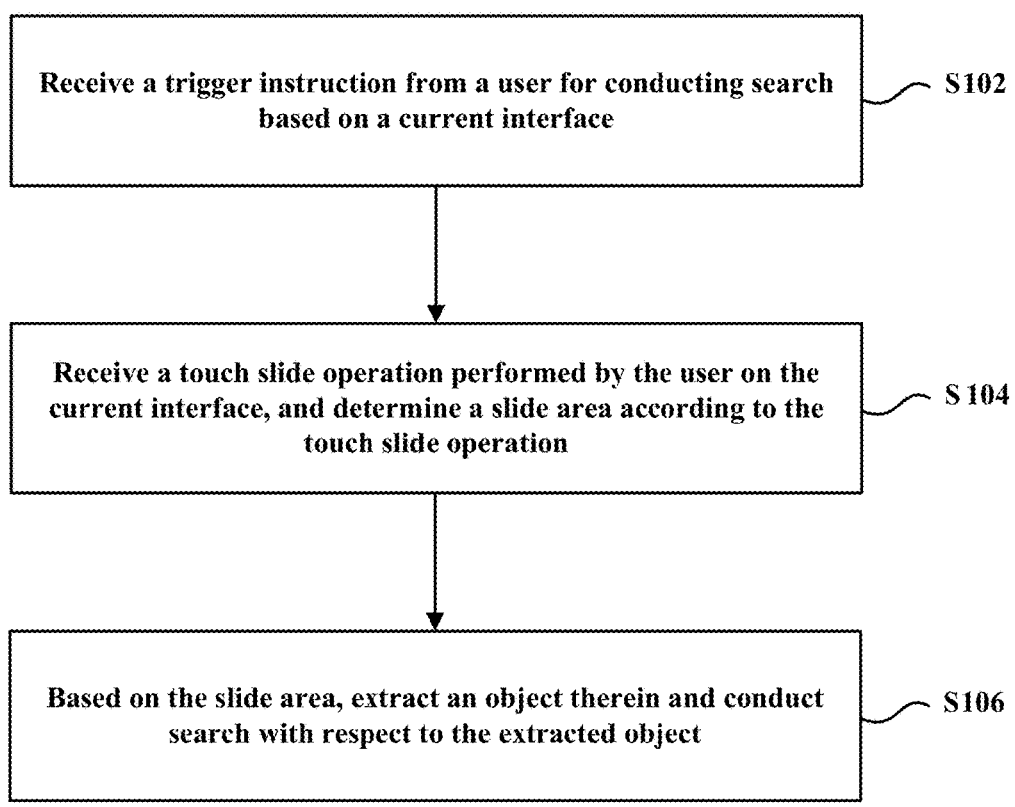
FIG. 1 shows schematically a schematic diagram of the architecture of an existing MYSQL database cluster.

In embodiment Two, the MYSQL database cluster as shown in FIG. 1 in the BACKGROUND OF THE INVENTION is still taken as an example, when the current master database of the database cluster runs down and can not provide services, take Slave-1 acting as a new master database to preform switching and data complementing is conducted for Slave-1 as an example to illustrate.

To more clearly illustrate the ideas of the invention, the embodiment will be described taking a full master database switching process as an example.

Figure 3:
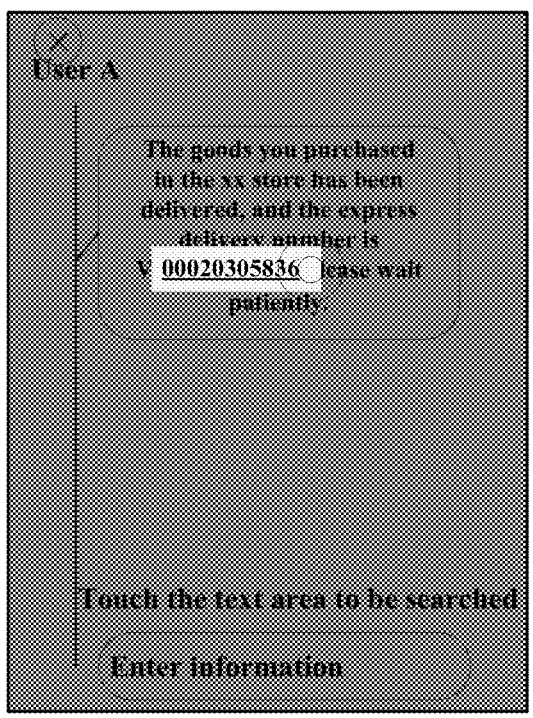
FIG. 3 shows schematically a schematic diagram of the flow of a data complementing method at the time of master database switching in a MYSQL database cluster provided by an embodiment of the invention.

As shown in FIG. 3, FIG. 3 is a schematic diagram of the flow of a data complementing method at the time of master database switching in a MYSQL database cluster provided by an embodiment of the invention. The method comprises step S301 to S304.

First, step S301 is performed to select a new master database when the master database of the MYSQL database can not provide services due to downtime.

It needs to be noted that when the master database of the MYSQL database runs down, it will result in that the entire MYSQL database cluster can not finish services, and therefore it is necessary to select a slave database therein to act as a new master database to preform switching, so as to restore the services of the MYSQL database. However, selection and switching of a new master database of the MYSQL database may comprise multiple methods, and in the invention, it will not be defined to use which method to conduct selection and switching of a new master database of the MYSQL database.

Moreover, the new master database may be in the MYSQL database cluster, or also may be in other MYSQL database cluster. If the new master database is in the current MYSQL database cluster, the amount of data that needs to be complemented is small, whereas if it is in other MYSQL database cluster, the data that needs to be complemented may be relatively much. However, when the amount of data is not large, the difference is not obvious.

To make the technical solution of the invention clearer, an embodiment of the invention further provides FIG. 4, which is a schematic diagram of the flow of a method for selecting a new master database in a MYSQL database cluster. The method employs a way of screening and obtaining a new master database in the MYSQL database cluster, and comprises the following steps.

At step S301-1, a list of all the slave databases of the MYSQL database cluster is obtained.

For example, for the instance as shown in FIG. 1, the slave databases are:

Slave-1, Slave-2, and Slave-3.

Therefore, the list of all the slave databases of the MYSQL database may consist of the above three slave databases, and in this list, the IP addresses of the above three slave databases may be used for recording, and a new master database is selected from the slave databases in the list.

At step S301-2, a slave database may be screened out from the slave databases recorded by the list to act as a new master database.

Further, that both the master database and the slave databases enable the gtid information is the primary condition for conducting master database switching for the database cluster. At the same time, to make the new master database more excellent, in addition to enabling the gtid information, further, the screening may also be conducted according to the following several conditions.

The state of the slave databases is an alive state, and the number of delayed transactions is less than a preset number.

When a new master database is screened out from the slave databases, there may be at least comprised the following three ways:

(1) judgment is performed on all the slave databases successively in a circular way, and if any slave database that meets the condition of acting as a new master database is obtained, the slave database is used as the new master database, and judgment of the other slave databases is stopped.

(2) judgment is performed on all the slave databases successively in a circular way, and after all the judgment is finished, a slave database that has the best condition is selected from slave databases that meet the condition of a new master database to act as the new master database.

For example, a slave database with the minimum delay time, with the minimum number of delayed transactions or that meets other preferred condition is selected as the new master database.

(3) judgment is performed on all the slave databases successively in a circular way, and after all the judgment is finished, a slave database is selected arbitrarily from slave databases that meet the condition of a new master database to act as the new master database.

In the embodiment, the process of screening out a slave database may generally comprise the following steps of A, B, C.

A) it is judged whether a current slave database is in the alive state; if yes, it proceeds to screen at step B; and if no, the slave database does not meet the condition of acting as a new master database, and it proceeds to judge a next slave database.

Therein, a method for judging whether a current slave database is in the alive state may be:

performing a ping operation on the current slave database; judging whether the corresponding delay time returned by it exceeds a preset time (e.g., which may be 0.5 ms); if no, judging that it is in the alive state; and if yes, judging that it is not in the alive state.

B) it is judged whether the gtid and binlog information of the current slave database is enabled; if yes, it proceeds to screen at step C; and if no, the slave database does not meet the condition of acting as a new master database, and it proceeds to judge a next slave database.

Therein, a gtid is created when a transaction on the original master database master is submitted; and since the gtid needs to maintain uniqueness in a global master-standby topology, a new master database may be conveniently promoted for some complex replication topologies by the gtid at the time of automatic switching, for example, the replication coordinates of a new standby database is determined by pointing to a specific gtid.

A gtid is generally made up of two parts:

gtid=source_id:transaction_id wherein source_id is used for identifying a source server which is denoted with server_uuid, and this value is generated upon first boot, and written into the configuration file data/auto.cnf of the MYSQL database; and transaction_id is determined according to which one of the submitted transactions it is from the first on the source server.

In general, the gtid is recorded in the binlog of the MYSQL database, and the event type it behaves as in the binlog may be:

GTID_LOG_EVENT, which is used for representing the GTID of a subsequent transaction;

ANONYMOUS_GTID_LOG_EVENT, which is an anonymous GTID event type; and

PREVIOUS_GTIDS_LOG_EVENT, which is used for representing a set of gtids that have been performed before the current binlog file.

It is generally recorded in the file header of the binlog.

At the time of query, information of the gtid, binlog, etc. may be queried and ensured to be enabled by executing the function check_candidate_eligibility.

C) it is judged whether the number of delayed transactions of the current slave database is less than a preset number; if yes, the current slave database meets the screening condition for a new master database; and if no, the current slave database does not meet the screening condition for a new master database, and it proceeds to judge a next slave database.

Therein, if the number of delayed transactions of the slave database is too many, it is indicated that it is in a poor situation, and it can not be used as the new master database, otherwise it may influence the running efficiency of the entire MYSQL database. The preset number may be 100.

It needs to be noted that when selecting a new master database, the judgment is unnecessarily conducted according to the order of step A, step B and step C, and any order may be employed for the judgment. Similarly, when selecting a new master database, it is not defined that the above three steps A, B and C must be included, and it may also be possible that only one or two of them is/are included, and related technical solutions should be encompassed within the scope of the invention.

In the embodiment, that Slave-1 is selected as the new master database is taken as an example. As shown in FIG. 5, FIG. 5 is a schematic diagram of the architecture of a MYSQL database cluster after selecting a new master database.

After the new master database Slave-1 is selected, step S302 is performed to establish first connections between the new master database and all the other slave databases therein.

In this embodiment, in the process of data complementing for the new master database, it is necessary to establish first connections between the new master database and all the other slave databases successively. In the invention, the order in which the connections are established will not be defined, the connections may be established sequentially, or may be established according to any order, as long as the connections between all the slave databases and the new master database are established.

Therein, the first connections are master-slave connections, and the other slave databases and the new master database are in a master-slave relationship. For example, in the embodiment, the relationships between Slave-1 and Slave-2, Slave-3 are master-slave relationships.

In the embodiment, a connection between the new master database Slave-1 and the slave database Slave-2 is first established and is taken as an example for illustration.

After the connections are established, step S303 is performed to compare the data of the new master database with the data in all the other slave databases to synchronize new data in the other slave databases into the new master database.

It needs to be noted that in the MYSQL database cluster mechanism, for the master database therein, its data and the data of multiple slave databases should be consistent. Therefore, if Slave-1 is switched to be the new master database, it is necessary to ensure that it has the latest data in the entire MYSQL database. Hence, it is necessary to compare the data in Slave-1 with data in all the other slave databases one by one.

When conducting data comparison with the slave databases, the form of one-by-one comparison may be adopted, and if new data exists in a slave database therein, the new data in the slave database is synchronized into the new master database.

Further, once comparison and new data synchronization is accomplished for a slave database therein, the method may further comprise:

disconnecting the first connection between the slave database and the new master database.

In a further embodiment, it may also be such that first connections between the new master database and all the slave databases are first established one by one, then data synchronization is accomplished one by one, and then all the first connections are disconnected. It will be appreciated by the skilled in the art that the invention does not define the establishment and disconnection of a connection and the order of data contrast, as long as data comparison and complementing may be accomplished, and related technical solutions should all be encompassed within the scope of the invention.

After data complementing of the new master database is accomplished, step S304 may be performed to switch the master database of the MYSQL database cluster to the new master database.

Therein, for the switching of the master database, it may be accomplished by modifying the configuration file of the MYSQL database.

Further, after the switching of the new master database is accomplished, there may be further comprised:

updating the newer configuration of the new master database to the intermediate layer and restoring the services.

Further, after the switching of the master database is accomplished, to guarantee that the data of all the databases in the database cluster is consistent, the method may further comprise:

establishing second connections between the new master database and all the other slave databases successively, to synchronize data in the new master database into all the other slave databases.

Therein, the second connections are also master-slave connections, and in the second connections, the new master database and the other slave databases have the master and slave statuses, respectively.

The embodiment of the invention provides a data complementing method at the time of master database switching in a MYSQL database cluster, wherein when the master database of the MYSQL database cluster can not provide services, a slave database is selected from the MYSQL database cluster to act as a new master database, first connections between the new master database and all the other slave databases are established successively, the data of the new master database is compared with the data of all the other slave databases, respectively, to synchronize new data in all the other slave databases into the new master database, to accomplish data complementing of the new master database, which causes the new master database to have the latest data in the MYSQL database cluster, guarantees smooth switching of the master database, and therefore will not influence normal running of MYSQL database services.

Embodiment Three

An embodiment of the invention provides a data complementing method, which may implement data complementing of a new master database in the process of master database switching in a database cluster, and guarantee the normal running of the database cluster.

The difference from embodiments One and Two lies in that the data complementing method provided by embodiment Three employs a way of establishing connections between the new master database and the other slave databases successively, and conducting comparison and synchronization with the other slave databases successively.

Figure 6:
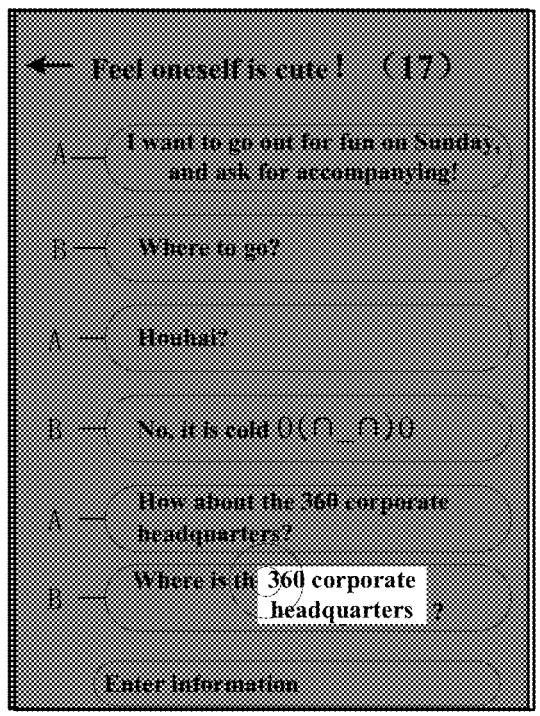
FIG. 6 shows schematically a schematic diagram of the flow of a data complementing method provided by an embodiment of the invention.

FIG. 6 is a schematic diagram of the flow of a data complementing method provided by an embodiment of the invention, which method is applied in master database switching in a master-slave database cluster and specifically comprises step S602 to step S610.

At S602, a slave database is selected from the database cluster to act as a new master database.

At S604, a first connection between the new master database and one other slave database is established.

At S606, the data of the new master database is compared with the data of the other slave database, to synchronize new data in the other slave database into the new master database.

At S608, steps S604 and S606 are repeated, until the data comparison and synchronization is accomplished for the new master database and all the other slave databases.

At S610, second connections are established between the new master database and all the other slave databases, to synchronize data of the new master database to all the other slave databases.

The embodiment of the invention provides a data complementing method, in which in the process of master database switching in a master-slave database cluster, a slave database is selected from the database cluster to act as a new master database, a first connection between the new master database and one other slave database is established, the data of the new master database is compared with the data of the other slave database, to synchronize new data in the other slave database into the new master database, the steps of establishing a first connection and data synchronization are repeated, until the data comparison and synchronization is accomplished between the new master database and all the other slave databases and second connections are established between the new master database and all the other slave databases, to synchronize data of the new master database to all the other slave databases, which may accomplish data complementing of the new master database, cause the new master database to have the latest data in the database cluster, guarantee smooth switching of the master database, update the data in all the slave databases to the latest data as well at the same time, and therefore will not influence normal running of database services.

Embodiment Four

The embodiment is a specific application scenario of the above embodiment Three, and by this embodiment, the method provided by the invention can be elucidated more clearly and particularly.

It should be appreciated that the invention does not define the type of a database, and any database may be applied herein, as long as it may use the following scheme of the invention to achieve the goal of high availability. In addition, the connection control apparatus is also not defined to be implemented by a server, and on the basis of reading the invention, the skilled in the art may also embody the connection control apparatus in other ways, which should all be encompassed within the scope of the invention.

In the following, a technical solution of the invention will be illustrated taking the MYSQL database as an example.

In embodiment Two, the MYSQL database cluster as shown in FIG. 1 in the BACKGROUND OF THE INVENTION is also taken as an example, when the current master database of the database cluster runs down and can not provide services, take Slave-1 acting as a new master database to preform switching and data complementing is conducted for Slave-1 as an example to illustrate.

To more clearly illustrate the ideas of the invention, the embodiment will be described taking a full master database switching process as an example.

Figure 7:
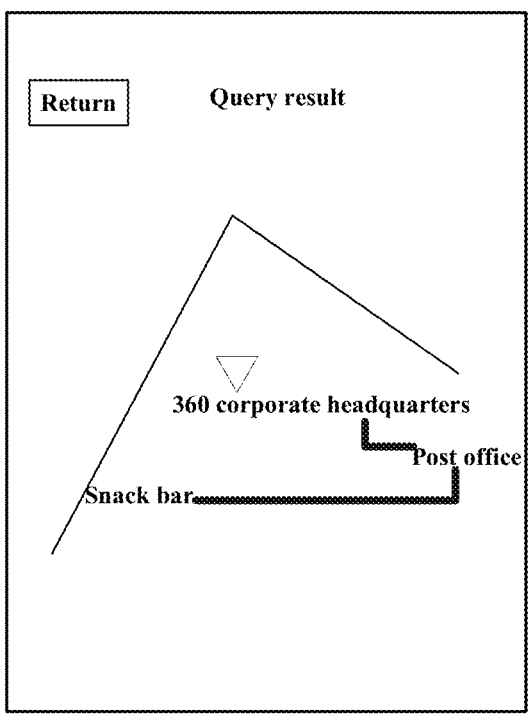
FIG. 7 shows schematically a schematic diagram of the flow of a data complementing method at the time of master database switching in a MYSQL database provided by an embodiment of the invention.

As shown in FIG. 7, FIG. 7 is a schematic diagram of the flow of a data complementing method at the time of master database switching in a MYSQL database provided by an embodiment of the invention. The method totally comprises step S701 to S708.

First, step S701 is performed to select a new master database when the master database of the MYSQL database cluster can not provide services.

Therein, the method for selecting a new master database is similar to step S301 of embodiment Two, and will not be repeated here.

After the new master database Slave-1 is selected, step S702 is performed to establish a first connection of the new master database and a slave database therein.

Unlike embodiment One and embodiment Two, the method provided by this embodiment is as follows. In the process of data complementing for the new master database, connections are successively established and comparison and synchronization is successively conducted between the new master database and all the other slave databases; and after comparison and synchronization is accomplished for a slave database, the first connection is disconnected, and a connection with a next slave database is established. In the invention, the order in which connections are established will not be defined, the connections may be established sequentially, or may be established according to any order, as long as all the slave databases are cycled once.

Therein, the first connection is a master-slave connection, and the other slave databases and the new master database are in a master-slave relationship. For example, in the embodiment, the relationships between Slave-1 and Slave-2, Slave-3 are master-slave relationships.

In the embodiment, a connection of the new master database Slave-1 and the slave database Slave-2 is first established and is taken as an example for illustration.

After the connection is established, step S703 is performed to compare the data of the new master database with the data in the slave database, and if there is no new data in the slave database, return to step S702 to establish a first connection with a next slave database; and if there is new data in the slave database, perform step S704.

It needs to be noted that in the MYSQL database cluster mechanism, for the master database therein, its data and the data of multiple slave databases should be consistent. Therefore, if Slave-1 is switched to be the new master database, it is necessary to ensure that it has the latest data in the entire MYSQL database. Hence, it is necessary to compare the data in Slave-1 with data in all the other slave databases one by one.

At step S704, the new data in the slave database is synchronized into the new master database.

Then, step S705 is performed to disconnect the first connection of the new master database and the slave database.

Then, step S706 is performed to judge whether comparison and synchronization is accomplished for all the slave databases, and if yes, perform step S707, and if no, return to step S702 to establish a connection with a next slave database.

After data complementing of the new master database is accomplished, step S707 may be performed to establish second connections between the new master database and all the other slave databases successively, to synchronize data in the new master database into all the other slave databases.

Therein, the second connections are also master-slave connections, and in the second connections, the new master database and the other slave databases have the master and slave statuses, respectively.

Then, step S708 is performed to switch the master database of the MYSQL database to the new master database.

Therein, for the switching of the master database, it may be accomplished by modifying the configuration file of the MYSQL database.

Further, after the switching of the new master database is accomplished, there may be further comprised:

updating the newer configuration of the new master database to the intermediate layer and restoring the services.

The embodiment of the invention provides a data complementing method, in which in the process of master database switching in a master-slave database cluster, a slave database is selected from the database cluster to act as a new master database, a first connection between the new master database and one other slave database is established, the data of the new master database is compared with the data of the other slave database, to synchronize new data in the other slave database into the new master database, the steps of establishing a first connection and data synchronization are repeated, until the data comparison and synchronization is accomplished for the new master database and all the other slave databases and second connections are established between the new master database and all the other slave databases, to synchronize data of the new master database to all the other slave databases, which may accomplish data complementing of the new master database, cause the new master database to have the latest data in the database cluster, guarantee smooth switching of the master database, update the data in all the slave databases to the latest data as well at the same time, and therefore will not influence normal running of database services.

Embodiment Five

Embodiment Five preferably corresponds to embodiment One and embodiment Two and provides a data complementing apparatus.

Figure 8:
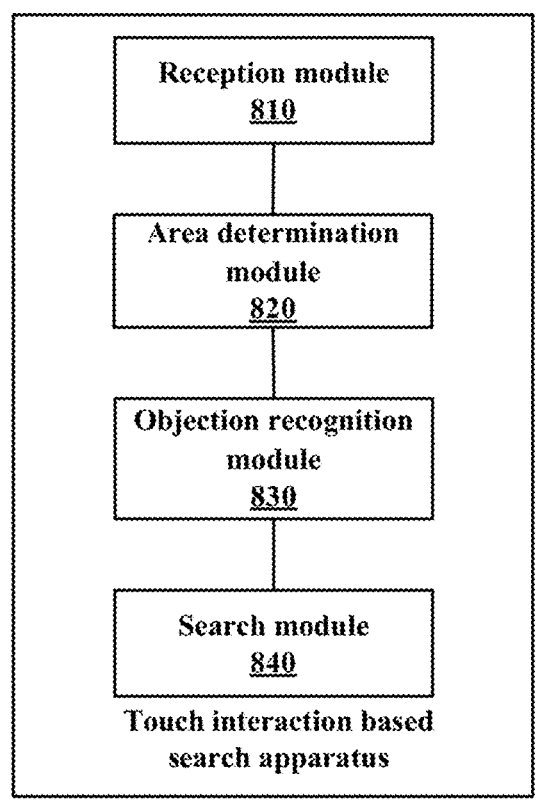
FIG. 8 shows schematically a schematic diagram of the structure of a data complementing apparatus provided by an embodiment of the invention.

FIG. 8 is a schematic diagram of the structure of a data complementing apparatus provided by an embodiment of the invention, which is applied in master database switching in a master-slave database cluster, the apparatus 800 comprising:

a first master database selecting module 810 configured to select a slave database from the database cluster to act as a new master database;

a first connection establishing module 820 coupled to the first master database selecting module 810 and configured to establishing first connections between the new master database and all the other slave databases successively;

a first synchronizing module 830 coupled to the first connection establishing module 820 and configured to compare the data of the new master database with the data of all the other slave databases, respectively, to synchronize new data in all the other slave databases into the new master database; and a first complementing confirmation module 840 coupled to the first synchronizing module 830 and configured to finish data complementing of the new master database when the data comparison and synchronization of all the other slave databases is accomplished.

Optionally, the first master database selecting module 810 further comprises:

a list obtaining unit 811 configured to obtain a list of all the slave databases of the database cluster before connections between the new master database and all the slave databases are established successively; and a master database screening unit 812 coupled to the list obtaining unit 811 and configured to, from all the slave databases recorded by the list, screen out and obtain a slave database that meets a preset condition to act as the new master database.

Optionally, the preset condition comprises at least one of:
the state of the slave database being identified as alive; and the number of delayed transactions of the slave database being less than a preset number.

Optionally, the first connections are master-slave connections, and the other slave databases and the new master database have the master and slave statuses, respectively.

Optionally, the first synchronizing module 830 is further configured to:

after data comparison and synchronization is accomplished between the new master database and one other slave database, disconnecting the first connection between the two.

Optionally, the apparatus 800 further comprises:

a second connection establishing module 850 coupled to the first complementing confirmation module 840 and configured to establishing second connections between the new master database and all the other slave databases successively after data complementing of the new master database is finished; and a second synchronizing module 860 coupled to the second connection establishing module 850 and configured to synchronize data of the new master database to all the other slave databases.

Optionally, the second connections are master-slave connections, and the new master database and the other slave databases have the master and slave statuses, respectively.

Optionally, the database cluster is a MYSQL database cluster.

The embodiment of the invention provides a data complementing apparatus, in which in the process of master database switching in a master-slave database cluster, a slave database is selected from the database cluster to act as a new master database, first connections between the new master database and all the other slave databases are established successively, the data of the new master database is compared with the data of all the other slave databases, respectively, to synchronize new data in all the other slave databases into the new master database, to accomplish data complementing of the new master database, which causes the new master database to have the latest data in the database cluster, guarantees smooth switching of the master database, and therefore will not influence normal running of database services.

Embodiment Six

Embodiment Six preferably corresponds to embodiment Three and embodiment Four and provides a data complementing apparatus.

Figure 9:
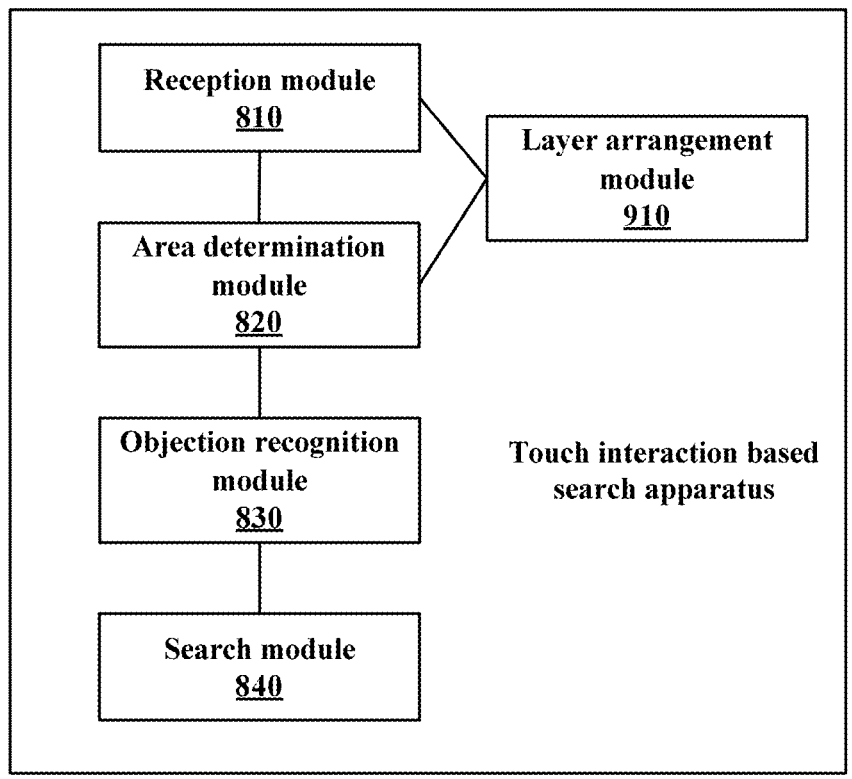
FIG. 9 is a schematic diagram of the structure of a data complementing apparatus provided by an embodiment of the invention.

FIG. 9 is a schematic diagram of the structure of a data complementing apparatus provided by an embodiment of the invention, which is applied in master database switching in a master-slave database cluster, the apparatus 900 comprising:

a second master database selecting module 910 configured to select a slave database from the database cluster to act as a new master database;

a third connection establishing module 920 coupled to the second master database selecting module 910 and configured to establish a first connection of the new master database and one other slave database;

a third synchronizing module 930 coupled to the third connection establishing module 920 and configured to compare the data of the new master database with the data of the other slave database, to synchronize new data in the other slave database into the new master database;

a second complementing confirmation module 940 coupled to the third synchronizing module 930 and configured to repeat the operations performed by the third connection establishing module 920 and the third synchronizing module 930, until the data comparison and synchronization is accomplished for the new master database and all the other slave databases; and a fourth connection establishing module 950 coupled to the second complementing confirmation module 940 and configured to establish second connections between the new master database and all the other slave databases, to synchronize data of the new master database to all the other slave databases.

Optionally, the third synchronizing module 930 is further configured to:

after data comparison and synchronization is accomplished for the new master database and the other slave database, disconnect the first connection between the two.

Optionally, the first connection is a master-slave connection, and the other slave database and the new master database have the master and slave statuses, respectively.

Optionally, the second connections are master-slave connections, and the new master database and the other slave databases have the master and slave statuses, respectively.

The embodiment of the invention provides a data complementing apparatus, in which in the process of master database switching in a master-slave database cluster, a slave database is selected from the database cluster to act as a new master database, a first connection between the new master database and one other slave database is established, the data of the new master database is compared with the data of the other slave database, to synchronize new data in the other slave database into the new master database, the steps of establishing a first connection and data synchronization are repeated, until the data comparison is accomplished for the new master database and all the other slave databases and second connections are established between the new master database and all the other slave databases, to synchronize data of the new master database to all the other slave databases, which may accomplish data complementing of the new master database, cause the new master database to have the latest data in the database cluster, guarantee smooth switching of the master database, update the data in all the slave databases to the latest data as well at the same time, and therefore will not influence normal running of database services.

In the specification provided herein, a plenty of particular details are described. However, it can be appreciated that an embodiment of the invention may be practiced without these particular details. In some embodiments, well known methods, structures and technologies are not illustrated in detail so as not to obscure the understanding of the specification.

Similarly, it shall be appreciated that in order to simplify the disclosure and help the understanding of one or more of all the inventive aspects, in the above description of the exemplary embodiments of the invention, sometimes individual features of the invention are grouped together into a single embodiment, figure or the description thereof. However, the disclosed methods should not be construed as reflecting the following intention, namely, the claimed invention claims more features than those explicitly recited in each claim. More precisely, as reflected in the following claims, an aspect of the invention lies in being less than all the features of individual embodiments disclosed previously. Therefore, the claims complying with a particular implementation are hereby incorporated into the particular implementation, wherein each claim itself acts as an individual embodiment of the invention.

It may be appreciated to those skilled in the art that modules in a device in an embodiment may be changed adaptively and arranged in one or more device different from the embodiment. Modules or units or assemblies may be combined into one module or unit or assembly, and additionally, they may be divided into multiple sub-modules or sub-units or subassemblies. Except that at least some of such features and/or procedures or units are mutually exclusive, all the features disclosed in the specification (including the accompanying claims, abstract and drawings) and all the procedures or units of any method or device disclosed as such may be combined employing any combination. Unless explicitly stated otherwise, each feature disclosed in the specification (including the accompanying claims, abstract and drawings) may be replaced by an alternative feature providing an identical, equal or similar objective.

Furthermore, it can be appreciated to the skilled in the art that although some embodiments described herein comprise some features and not other features comprised in other embodiment, a combination of features of different embodiments is indicative of being within the scope of the invention and forming a different embodiment. For example, in the following claims, any one of the claimed embodiments may be used in any combination.

Embodiments of the individual components of the invention may be implemented in hardware, or in a software module running on one or more processors, or in a combination thereof. It will be appreciated by those skilled in the art that, in practice, some or all of the functions of some or all of the components in a data complementing device according to embodiments of the invention may be realized using a microprocessor or a digital signal processor (DSP). The invention may also be implemented as a device or apparatus program (e.g., a computer program and a computer program product) for carrying out a part or all of the method as described herein. Such a program implementing the invention may be stored on a computer readable medium, or may be in the form of one or more signals. Such a signal may be obtained by downloading it from an Internet website, or provided on a carrier signal, or provided in any other form.

Figure 10:
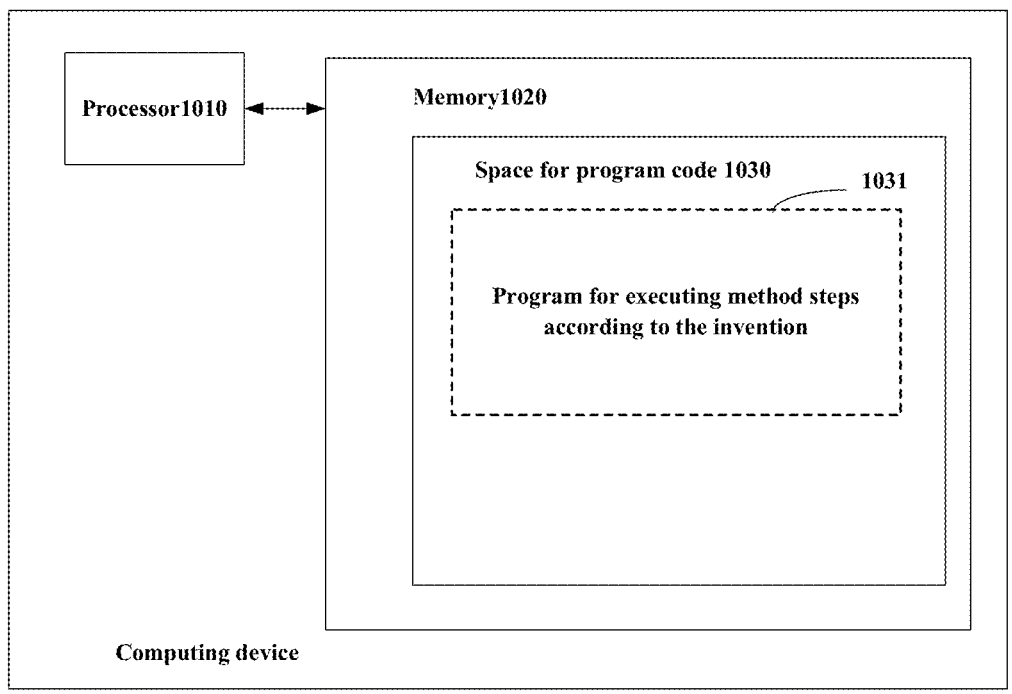
FIG. 10 shows schematically a block diagram of a computing device for performing a data complementing method according to the invention.
Figure 11:
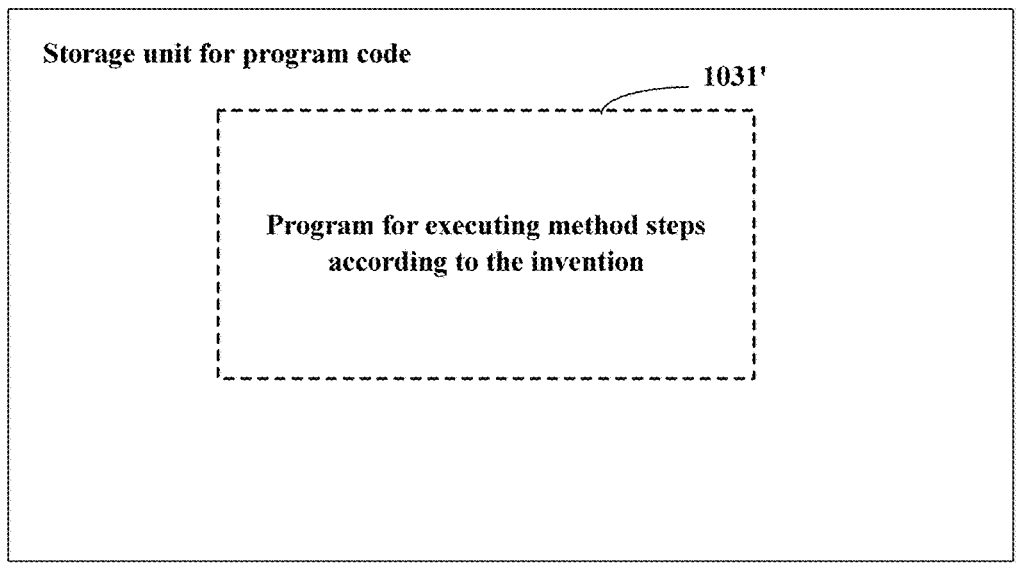
FIG. 11 shows schematically a storage unit for retaining or carrying a program code implementing a data complementing method according to the invention.

For example, FIG. 10 shows a block diagram of a computing device which may carry out any data complementing method according to the invention. The computing device traditionally comprises a processor 1010 and a computer program product or a computer readable medium in the form of a memory 1020. The memory 1020 may be an electronic memory such as a flash memory, an EEPROM (electrically erasable programmable read-only memory), an EPROM, a hard disk or a ROM. The memory 1020 has a memory space 1030 for storing a program code 1031 for carrying out any method steps in the methods as described above. For example, the memory space 1030 for storing a program code may comprise individual program codes 1031 for carrying out individual steps in the above methods, respectively. The program codes may be read out from or written to one or more computer program products. These computer program products comprise such a program code carrier as a hard disk, a compact disk (CD), a memory card or a floppy disk. Such a computer program product is generally a portable or stationary storage unit as shown in e.g., FIG. 11. The storage unit may have a memory segment, a memory space, etc. arranged similarly to the memory 1020 in the computing device of FIG. 10. The program code may for example be compressed in an appropriate form. In general, the storage unit comprises a computer readable code 1031' for carrying out method steps according to the invention, i.e., a code which may be read by e.g., a processor such as 1010, and when run by a computing device, the codes cause the computing device to carry out individual steps in the methods described above.

"An embodiment", "the embodiment" or "one or more embodiments" mentioned herein implies that a particular feature, structure or characteristic described in connection with an embodiment is included in at least one embodiment of the invention. In addition, it is to be noted that, examples of a phrase "in an embodiment" herein do not necessarily all refer to one and the same embodiment.

It is to be noted that the above embodiments illustrate rather than limit the invention, and those skilled in the art may design alternative embodiments without departing the scope of the appended claims. In the claims, any reference sign placed between the parentheses shall not be construed as limiting to a claim. The word "comprise" does not exclude the presence of an element or a step not listed in a claim. The word "a" or "an" preceding an element does not exclude the presence of a plurality of such elements. The invention may be implemented by means of a hardware comprising several distinct elements and by means of a suitably programmed computer. In a unit claim enumerating several apparatuses, several of the apparatuses may be embodied by one and the same hardware item. Use of the words first, second, and third, etc. does not mean any ordering. Such words may be construed as naming.

Furthermore, it is also to be noted that the language used in the description is selected mainly for the purpose of readability and teaching, but not selected for explaining or defining the subject matter of the invention. Therefore, for those of ordinary skills in the art, many modifications and variations are apparent without departing the scope and spirit of the appended claims. For the scope of the invention, the disclosure of the invention is illustrative, but not limiting, and the scope of the invention is defined by the appended claims.

The invention claimed is:

1. A data complementing method applied in master database switching in a master-slave database cluster, the method comprising:
    selecting a slave database from the database cluster to act as a new master database;
    establishing first connections between the new master database and all the other slave databases successively;
    comparing data of the new master database with data of all the other slave databases, respectively, to synchronize new data in all the other slave databases into the new master database; and
    finishing data complementing of the new master database when data comparison and synchronization of all the other slave databases is accomplished,
    wherein selecting a slave database from the database cluster to act as a new master database comprises:
        obtaining a list of all the slave databases of the database cluster before the establishing connections between the new master database and all the slave databases successively; and
        from all the slave databases recorded by the list, screening out and obtaining a slave database that meets a preset condition to act as the new master database, and wherein the preset condition comprises at least one of:
            the state of the slave database being identified as alive; and
            the number of delayed transactions of the slave database being less than a preset number.

2. The method as claimed in claim 1, wherein the first connections are master-slave connections, and the other slave databases and the new master database have the master and slave statuses, respectively.

3. The method as claimed in claim 1, wherein the step of comparing the data of the new master database with the data of all the other slave databases, respectively, to synchronize new data in all the other slave databases into the new master database, further comprises: after data comparison and synchronization is accomplished between the new master database and one other slave database, disconnecting the first connection between them.

4. The method as claimed in claim 1, wherein the method further comprises: establishing second connections between the new master database and all the other slave databases successively after data complementing of the new master database is finished; and synchronizing data of the new master database to all the other slave databases.

5. The method as claimed in claim 4, wherein the second connections are master-slave connections, and the new master database and the other slave databases have the master and slave statuses, respectively.

6. The method as claimed in claim 1, wherein the database cluster is a MYSQL database cluster.

7. A data complementing apparatus applied in master database switching in a master-slave database cluster, the apparatus comprising:
    a memory having instructions stored thereon:
    a processor configured to execute the instructions to perform the following operations:
    selecting a slave database from the database cluster to act as a new master database;
    establishing first connections between the new master database and all the other slave databases successively;
    comparing data of the new master database with data of all the other slave databases, respectively, to synchronize new data in all the other slave databases into the new master database; and
    finishing data complementing of the new master database when the data comparison and synchronization of all the other slave databases is accomplished,
    wherein selecting a slave database from the database cluster to act as a new master database comprises:
        obtaining a list of all the slave databases of the database cluster before the establishing connections between the new master database and all the slave databases successively; and
        from all the slave databases recorded by the list, screening out and obtaining a slave database that meets a preset condition to act as the new master database, and wherein the preset condition comprises at least one of:

the state of the slave database being identified as alive; and the number of delayed transactions of the slave database being less than a preset number.

8. The apparatus as claimed in claim 7, wherein the first connections are master-slave connections, and the other slave databases and the new master database have the master and slave statuses, respectively.

9. The apparatus as claimed in claim 7, wherein the comparing the data of the new master database with the data of all the other slave databases, respectively, to synchronize new data in all the other slave databases into the new master database, further comprises: after data comparison and synchronization is accomplished between the new master database and one other slave database, disconnecting the first connection between them.

10. The apparatus as claimed in claim 7, wherein the operations further comprises:

establishing second connections between the new master database and all the other slave databases successively after data complementing of the new master database is finished; and synchronizing data of the new master database to all the other slave databases.

11. The apparatus as claimed in claim 10, wherein the second connections are master-slave connections, and the new master database and the other slave databases have the master and slave statuses, respectively.

12. The apparatus as claimed in claim 7, wherein the database cluster is a MYSQL database cluster.

13. A non-transitory computer readable medium having instructions stored thereon that when executed by at least one processor, cause the at least one processor to perform following operations:

selecting a slave database from the database cluster to act as a new master database:

establishing first connections between the new master database and all the other slave databases successively:

comparing data of the new master database with data of all the other slave databases, respectively, to synchronize new data in all the other slave databases into the new master database; and finishing data complementing of the new master database when data comparison and synchronization of all the other slave databases is accomplished, wherein selecting a slave database from the database cluster to act as a new master database comprises:

obtaining a list of all the slave databases of the database cluster before the establishing connections between the new master database and all the slave databases successively; and from all the slave databases recorded by the list, screening out and obtaining a slave database that meets a preset condition to act as the new master database, and wherein the preset condition comprises at least one of:

the state of the slave database being identified as alive; and the number of delayed transactions of the slave database being less than a preset number.

\* \* \* \* \*